United States Patent
Licht et al.

(10) Patent No.: US 6,616,797 B1
(45) Date of Patent: *Sep. 9, 2003

(54) PREPARATION OF ADHESIVE BONDS USING CARBODIIMIDE-CONTAINING DISPERSIONS WITH HEAT ACTIVATION

(75) Inventors: Ulrike Licht, Mannheim (DE); Eckehardt Wistuba, Bad Dürkheim (DE); Hans J. Neumann, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,057

(22) Filed: Jan. 24, 2000

(30) Foreign Application Priority Data

Feb. 3, 1999 (DE) .......................... 199 04 159

(51) Int. Cl.[7] .............................. C09J 5/06; C09J 175/04
(52) U.S. Cl. ................................ 156/324.4; 156/331.7; 524/591
(58) Field of Search ........................ 156/324.4, 331.7; 524/591

(56) References Cited

U.S. PATENT DOCUMENTS

| | | |
|---|---|---|
| 2,840,589 A | 6/1958 | Smeltz |
| 2,941,966 A | 6/1960 | Campbell |
| 4,223,113 A | 9/1980 | Bier et al. |
| 4,223,125 A | 9/1980 | Bier et al. |
| 4,294,719 A | 10/1981 | Wagner et al. |
| 4,344,855 A | 8/1982 | Schafer et al. |
| 4,435,546 A | 3/1984 | Bier et al. |
| 5,498,747 A | 3/1996 | Pohl et al. |
| 5,652,299 A * | 7/1997 | Nakajima et al. ........... 524/591 |
| 5,688,356 A * | 11/1997 | Sagiv ...................... 156/331.7 |
| 5,916,675 A * | 6/1999 | Komoto et al. .......... 156/331.7 |
| 6,395,824 B1 * | 5/2002 | Beutler et al. .............. 524/591 |

FOREIGN PATENT DOCUMENTS

| | | |
|---|---|---|
| DE | 25 04 400 | 8/1976 |
| DE | 25 52 350 | 5/1977 |
| DE | 25 53 120 | 10/1986 |
| EP | 0 628 541 | 12/1994 |
| WO | WO 99/06460 | 2/1999 |

OTHER PUBLICATIONS

G. Oertel, Polyurethane, Kunststoff Handdbuch 7, pp. 24–25, "Neure Entwicklungen" pps. 24–25, 1983.
G. Oertel, Polyurethane, Kunststoff Handdbuch 7, pp. 571–574, "Polyurethane Feur Textil, Papier Und Leder," 1983.
G. Oertel, Polyurethane, Kunststoff Handdbuch 7, pp. 591–592, "Polyurethan–Klebstoff," 1983.
P.W. Campbell, et al., Journal of Organic Chemistry, vol. 28, pp. 2069–2075, "Carboniimides. IV. High Polymers Containing the Carbodiimide Repeat Unit," Aug. 1963.

* cited by examiner

*Primary Examiner*—Sam Chuan Yao
(74) *Attorney, Agent, or Firm*—Oblon, Spivak, McClelland, Maier & Neustadt, P.C.

(57) ABSTRACT

Adhesive bonds can be formed by a process that includes applying a dispersion containing a polyurethane which has structural units of formula (I)

$$-N=C=N- \qquad (I)$$

to a surface. The dispersion is first coated onto the surface to form a coating. The coating is dried to give an essentially anhydrous coating. The dried coating is then subjected to heat activation. The adhesive bond is formed by joining the heat activated coating to itself or to another surface.

10 Claims, No Drawings

PREPARATION OF ADHESIVE BONDS USING CARBODIIMIDE-CONTAINING DISPERSIONS WITH HEAT ACTIVATION

BACKGROUND OF THE INVENTION

1. Field of the Invention

The present invention relates to processes for producing adhesive bonds by means of a dispersion D comprising a polyurethane (1) which comprises carbodiimide structural units of the formula (I)

$$-N=C=N- \qquad (I)$$

by

I. coating the surface of an article with the dispersion D,

II. drying the dispersion D with which the article is coated to give an essentially anhydrous coating (coating II), and III. producing a coating III by subjecting the coating II to heat activation.

2. Discussion of the Background

Polyurethane dispersions having anionic groups and their use as adhesives are common knowledge (cf. D. G. Oertel "Kunststoff-Handbuch" Volume 7, 2nd edition, 1983, Carl Hanser Verlag, Munich, Vienna, pp. 24 to 25, pp. 571 to 574 and pp. 591 to 592).

Polyurethane dispersions are frequently employed as adhesives in a form in which they are applied as a film to the workpiece to be bonded, the water is evaporated, the dried film is heated (activated) briefly at temperatures from about 40 to 100° C., and this workpiece is bonded to another workpiece.

Using adhesive dispersions having a satisfactory level of properties it is possible in this way to form firm connections between workpieces composed of different materials, such as metal, wood, woodbase materials, glass and plastic. These composites possess both high shear strength and high peel strength.

Among adhesives processors there is an increasing desire for adhesive dispersions which despite a low activation temperature give rise to adhesive bonds which not only have a high load-bearing capacity at room temperature but which also withstand subsequent loading even at temperatures markedly above the activation temperature. This property is referred to in the art as heat resistance. Here, the maximum temperature at which the adhesive bond can still be subjected to loading without being destroyed in the process should be as far as possible above the temperature to which the adhesive film is heated to activate it prior to bonding (activation temperature). Moreover, the adhesive bonds should be capable of bearing high loads just a short time after bonding; in other words, they should have a high immediate strength.

The application PCT 98/04483 further generally discloses the use as adhesives of dispersions containing carbodiimide. Nothing, however, is stated therein regarding the method of heat activation.

SUMMARY OF THE INVENTION

It is an object of the invention to provide for improved bonding. We have found that this object is achieved by the bonding process specified at the outset.

The dispersions D that are used in the process of the invention contain carbodiimide structural units of the formula (I) preferably in amounts of from 5 to 200, with particularly preference in amounts of from 5 to 150 and, with very particular preference, in amounts of from 10 to 100 mmol per kg of polyurethane (1).

The carbodiimide structural units of the formula (I) can be incorporated into the polyurethane (1) with particular ease by synthesizing the polyurethane using, in whole or in part, diisocyanates (a1.1) which have on average from 1 to 10, preferably from 1 to 4, structural units of the formula (I).)

Examples of suitable diisocyanatocarbodiimides (a1.1) are those of the formula (Ia1.1)

$$OCN-(R^1-N=C=N)_m-R^1-NCO \qquad (Ia1.1)$$

where $R^1$ is a divalent hydrocarbon radical with or without urethane, ester and/or ether groups, as is obtained by removing the isocyanate groups from a simple organic isocyanate or from a prepolymer containing urethane groups and, if desired, ether or ester groups and carrying terminal isocyanate groups, it being possible when there are two or more radicals $R^1$ in the same molecule for these radicals $R^1$ to have different meanings within the stated definition at the same time, and m being an integral or (on average) fractional number from 1 to 10, preferably from 1 to 4.

The radicals $R^1$ are preferably derived by abstracting the isocyanate groups from monomers (a1), which are the diisocyanates typically used in polyurethane chemistry.

As monomers (a1), particular mention may be made of diisocyanates $X(NCO)_2$, where X is an aliphatic hydrocarbon radical having 4 to 12 carbon atoms, a cycloaliphatic or aromatic hydrocarbon radical having 6 to 15 carbon atoms, or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis and the cis/trans isomers, and mixtures of these compounds.

Examples of mixtures of these isocyanates are the mixtures of the respective structural isomers of diisocyanatotoluene and diisocyanatodiphenylmethane, with particular suitability being attached to the mixture comprising 80 mol % 2,4-diisocyanatotoluene and 20 mol % 2,6-diisocyanatotoluene. Further advantageous mixtures are those of aromatic isocyanates such as 2,4-diisocyanatotoluene and/or 2,6-diisocyanatotoluene with aliphatic or cycloaliphatic isocyanates such as hexamethylene diisocyanate, HMDI or IPDI, with the preferred ratio of aliphatic to aromatic isocyanates being from 4:1 to 1:4.

The radicals $R^1$ derive by abstracting the isocyanate groups from a prepolymer having urethane groups, ether or ester groups if desired, and terminal isocyanate groups are preferably those built up from the diols (b1) and the diisocyanates (a1.2).

The preparation of the monomers (a1.1) is known per se and is described, for example, in U.S. Pat. Nos. 2,840,589, 2,941,966 and EP-A-628 541 and by P. W. Campbell and K. C. Smeltz in Journal of Organic Chemistry, 28, 2069 (1963). Diisocyanatocarbodiimides can also be obtained in a particularly gentle manner, and free from byproducts, by heterogeneous catalysis in accordance with DE-A 2 504 400 and DE-A 2 552 350. The carbodiimidization of diisocyantes in the presence of very small amounts of phospholine oxide with subsequent blocking of the catalyst using acid chlorides is described in DE-A 2 653 120.

In general, the diisocyanates (a1.2) are used not only to prepare the diisocyanates (a1.1) but also-directly for the synthesis of the polyurethanes that are present in polyurethane dispersions of the invention, since the synthesis of the polyurethanes frequently requires more isocyanate than is necessary to inroduce the carbodiimide groups.

To synthesize the polyurethanes it is possible as compounds (a1.2) to use not only the abovementioned isocyanates but also isocyanates which in addition to the free isocyanate groups carry further blocked isocyanate groups, e.g., uretdione groups.

With a view to good filming and elasticity, compounds which are ideally suitable as diols (b1) are diols (b1.1) of relatively high molecular weight, this molecular weight being from about 500 to 5000, preferably from about 1000 to 3000 g/mol.

The diols (b1.1) are, in particular, polyester polyols which are known, for example, from Ullmanns Encyklopädie der technischen Chemie, 4th edition, Volume 19, pp. 62 to 65. It is preferred to use polyester polyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyester polyols. The polycarboxylic acids can be aliphatic, cycloaliphatic, araliphatic, aromatic or heterocyclic and can be unsubstituted or substituted, for example by halogens, and/or saturated or unsaturated. Examples are suberic acid, azelaic acid, phthalic acid, isophthalic acid, terephthalic acid, phthalic anhydride, tetrahydrophthalic anhydride, hexahydrophthalic anhydride, tetrachlorophthalic anhydride, endomethylene-tetrahydrophthalic anhydride, glutaric anhydride, maleic acid, maleic anhydride, fumaric acid, and dimeric fatty acids. Preference is given to dicarboxylic acids of the formula HOOC—$(CH_2)_y$—COOH, where y is a number from 1 to 20, preferably an even number from 2 to 20, examples being succinic acid, adipic acid, sebacic acid, and dodecanedicarboxylic acid.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the formula HO—$(CH_2)_x$—OH, where x is a number from 1 to 20, preferably an even number from 2 to 20. Examples are ethylene glycol, 1,4-butanediol, 1,6-hexanediol, 1,8-octanediol and 1,12-dodecanediol. Further preference is given neopentyl glycol and 1,5-pentanediol.

Also suitable are polycarbonate diols as can be obtained, for example, by reacting phosgene with an excess of the low molecular mass alcohols cited as structural components for the polyester polyols.

Lactone-based polyester diols are also suitable, these being homopolymers or copolymers of lactones, preferably hydroxyl-terminal adducts of lactones with suitable difunctional starter molecules. Suitable lactones are preferably those derived from compounds of the formula HO—$(CH_2)_z$—COOH where z is a number from 1 to 20 and one hydrogen atom of a methylene unit can also be substituted by a $C_1$–$C_4$ alkyl radical. Examples are epsilon-caprolactone, β-propiolactone, gamma-butyrolactone and/or methyl-epsilon-caprolactone and also mixtures thereof. Examples of suitable starter components are the low molecular mass dihydric alcohols specified above as structural components for the polyester polyols. The corresponding polymers of epsilon-caprolactone are particularly preferred. Lower polyester diols or polyether diols can also be used as starters for preparing the lactone polymers. Instead of the polymers of lactones it is also possible to use the corresponding, chemically equivalent polycondensates of the hydroxy carboxylic acids corresponding to the lactones.

Further suitable monomers (b1.1) are polyether diols. They are obtainable in particular by polymerizing ethylene oxide, propylene oxide, butylene oxide, tetrahydrofuran, styrene oxide or epichlorohydrin with itself, in the presence of $BF_3$ for example, or by adding these compounds, alone or in a mixture or in succession, onto starter components containing reactive hydrogen atoms, such as alcohols or amines, examples being water, ethylene glycol, 1,2-propanediol, 1,3-propanediol, 1,2-bis(4-hydroxyphenyl) propane and aniline. Particular preference is given to polytetrahydrofuran having a molecular weight of from 240 to 5000, and especially from 500 to 4500.

Likewise suitable are polyhydroxy olefins, preferably those having 2 terminal hydroxyl groups, examples being alpha,omega-dihydroxypolybutadiene, alpha,omega-dihydroxypolymethacrylic esters or alpha,omega-dihydroxypolyacrylic esters as monomers (c1). Such compounds are known, for example, from EP-A-0 622 378. Further suitable polyols are polyacetals, polysiloxanes, and alkyd resins.

The polyols can also be used as mixtures in a ratio of from 0.1:1 to 1:9.

The hardness and the modulus of elasticity of the polyurethanes can be increased by using as diols (b1) not only the diols (b1.1) but also diols (b1.2) having a low molecular weight of from about 62 to 500, preferably from 62 to 200, g/mol.

Compounds used in particular as monomers (b1.2) are the structural components of the short-chain alkanediols specified for the preparation of polyester polyols, preference being given to the unbranched diols having 2, 4, 6, 8, 10 or 12 carbon atoms and also to 1,5-pentanediol and neopentyl glycol.

The fraction of the diols (b 1.1), based on the total amount of diols (b1), is preferably from 10 to 100 mol % and the fraction of the monomers (b1.2), based on the total amount of diols (b1), is preferably from 0 to 90 mol %. With particular preference the ratio of the diols (b1.1) to the monomers (b1.2) is from 0.1:1 to 5:1, more preferably from 0.2:1 to 2:1.

In order to render the polyurethanes (1) dispersible in water they are synthesized, in addition to components (a1), (b1) and (d1), from monomers (c1)which are different from the components (a1), (b1) and (d1) and which carry at least one isocyanate group or at least one isocyanate-reactive group and, in addition, at least one hydrophilic group or a group which can be converted into a hydrophilic group. In the text below the term "hydrophilic groups or potentially hydrophilic groups" is shortened to "(potentially) hydrophilic groups". The (potentially) hydrophilic groups react with isocyanates much more slowly than do the functional groups of the monomers used to build up the polymer main chain.

The fraction of components having (potentially) hydrophilic groups among the total amount of components (a1), (b1), (c1), (d1) and (e1) is generally such that the molar amount of the (potentially) hydrophilic groups, based on the amount by weight of all monomers (a1) to (e1), is from 30 to 1000, preferably from 50 to 500 and, with particular preference, from 80 to 300 mmol/kg.

The (potentially) hydrophilic groups can be nonionic or, preferably, (potentially) ionic hydrophilic groups.

Particularly suitable nonionic hydrophilic groups are hydrophilic polyalkylene oxide residues, especially polyethylene glycol ethers of preferably 5 to 100, preferably 10 to 80, ethylene oxide repeating units. The proportion of polyethylene oxide units is generally from 0 to 10, preferably from 0 to 6% by weight, based on the amount by weight of all monomers (a1) to (e1).

Preferred monomers having nonionic hydrophilic groups are hydrophilic polyalkylene oxides, polyethylene oxide monools, and the reaction products of a polyethylene glycol and a diisocyanate which carry a terminally etherified polyethylene glycol residue. Isocyanates of this kind and processes for preparing them are specified in patents U.S. Pat. Nos. 3,905,929 and 3,920,598.

Ionic hydrophilic groups are primarily anionic groups such as the sulfonate, the carboxylate and the phosphate group in the form of their alkali metal salts or ammonium salts, and also cationic groups such as ammonium groups, especially protonated tertiary amino groups or quaternary ammonium groups.

Potentially ionic hydrophilic groups are, in particular, those which can be converted by simple neutralization, hydrolysis or quaternization reactions into the abovementioned ionic hydrophilic groups, examples thus being carboxylic acid groups or tertiary amino groups.

(Potentially) ionic monomers (c1)are described in detail in, for example, Ullmanns Encyklopädie der technischen Chemie, 4th edition, Volume 19, pp. 311–313 and, for example, in DE-A 1 495 745.

Of particular practical importance as (potentially) cationic monomers (c1)are primarily monomers having tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, the alkyl radicals and alkanediyl units of these tertiary amines consisting independently of one another of 1 to 6 carbon atoms. Also suitable are polyethers having tertiary nitrogen atoms and preferably two terminal hydroxyl groups, as are obtainable in conventional manner, for example, by alkoxylating amines having two hydrogen atoms attached to the amine nitrogen, such as methylamine, aniline or N,N'-dimethylhydrazine. Polyethers of this kind generally have a molecular weight of between 500 and 6000 g/mol.

These tertiary amines are converted to the ammonium salts either with acids, preferably strong mineral acids such as phosphoric acid, sulfuric acid or hydrohalic acids, or strong organic acids, or by reaction with suitable quaternizing agents such as $C_1$–$C_6$ alkyl halides or benzyl halides, e.g., bromides or chlorides.

Suitable monomers having (potentially) anionic groups are, conventionally, aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 carbon atoms, as are described, inter alia, in U.S. Pat. No. 3,412, 054. Particular preference is given to compounds of the formula (d1)

where $R^1$ and $R^2$ are $C_1$–$C_4$ alkanediyl and $R^3$ is $C_1$–$C_4$ alkyl, and especially to dimethylolpropionic acid (DMPA).

Corresponding dihydroxy sulfonic acids and dihydroxy phosphonic acids, such as 2,3-dihydroxypropanephosphonic acid, are also suitable.

Other suitable compounds include dihydroxy compounds having a molecular weight of more than 500 to 10,000 g/mol and at least 2 carboxylate groups, which are known from DE-A 3 911 827. They can be obtained by reacting dihydroxy compounds with tetracarboxylic dianhydrides such as pyromellitic dianhydride or cyclopentanetetracarboxylic dianhydride in a polyaddition reaction in a molar ratio of from 2:1 to 1.05:1. Particularly suitable dihydroxy compounds are the monomers (b1.2) listed as chain extenders and also the diols (b1.1).

As monomers (c1)having isocyanate-reactive amino groups it is possible to consider amino carboxylic acids such as lysine, β-alanine or the adducts of aliphatic diprimary diamines with alpha,beta-unsaturated carboxylic or sulfonic acids, these adducts being specified in DE-A-2 034 479.

Such compounds conform, for example, to the formula (d2)

$$H_2N—R^4—NH—R^5—X \qquad (d2)$$

where $R^4$ and $R^5$ independently of one another are a $C_1$–$C_6$ alkanediyl unit, preferably ethylene, and x is COOH or $SO_3H$.

Particularly preferred compounds of the formula (d2) are N-(2-aminoethyl)-2-aminoethanecarboxylic acid and N-(2-aminoethyl)-2-aminoethanesulfonic acid, and the corresponding alkali metal salts, sodium being a particularly preferred counterion.

Particular preference is extended to the adducts of the abovementioned aliphatic diprimary diamines with 2-acrylamido-2-methylpropanesulfonic acid, as are described, for example, in DE Patent 1 954 090.

Where monomers having potentially ionic grups are used, their conversion to the ionic form can take place before, during or, preferably, after the isocyanate polyaddition, since the ionic monomers frequently dissolved poorly in the reaction mixture. With particular preference the sulfonate or carboxylate groups are in the form of their salts with an alkali metal ion or with an ammonium ion as counterion, very particular preference being given to the combination of carboxylate groups with ammonium ions as counterions. Particularly suitable amines that can be used to neutralize the sulfonic acid or carboxyl groups are triethylamine, dimethylethanolamine, trimethylamine, or ammonia.

The monomers (d1), which are different from the monomers (a1) to (c1), serve primarily for crosslinking or chain extension. They are generally nonphenolic alcohols with a hydricity of more than two, amines having 2 or more primary and/or secondary amino groups, and compounds which in addition to one or more alcoholic hydroxyl groups carry one or more primary and/or secondary amino groups.

Alcohols having a functionality of more than 2 which can be used to establish a certain degree of branching or crosslinking are, for example, trimethylolpropane, glycerol, or sugars.

Also suitable are monoalcohols which in addition to the hydroxyl group carry a further isocyanate-reactive group, such as monoalcohols having one or more primary and/or secondary amino groups, an example being monoethanolamine.

Polyamines having 2 or more primary and/or secondary amino groups are used in particular when the chain extension and/or crosslinking is intended to take place in the presence of water, since amines generally react faster with isocyanates than do alcohols or water. This is often necessary when aqueous dispersions of crosslinked polyurethanes or polyurethanes having a high molecular weight are required. In such cases, the procedure is to prepare prepolymers having isocyanate groups, to disperse these prepolymers rapidly in water and then, by adding compounds having two or more isocyanate-reactive amino groups, to carry out chain extension or crosslinking.

Amines suitable for this purpose are generally polyfunctional amines from the molecular weight range from 32 to 500 g/mol, preferably from 60 to 300 g/mol, which contain at least two amino groups selected from the group consisting of primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine and hydrazine hydrate, or triamines such as diethylenetriamine and 1,8-diamino-4-aminomethyloctane.

The amines can also be used in blocked form, e.g., in the form of the corresponding ketimines (see e.g. CA-A-1 129 128), ketazines (cf. e.g. U.S. Pat. No. 4,269,748) or amine salts (see U.S. Pat. No. 4,292,226). Oxazolidines, moreover, as are used for example in U.S. Pat. No. 4,192,937, constitute blocked polyamines which can be employed in preparing the polyurethanes of the invention for chain extending the prepolymers. When such blocked polyamines are used they are generally mixed with the prepolymers in the absence of water and this mixture is subsequently combined with the water of the dispersion, or with a portion thereof, so that the corresponding polyamines are liberated by hydrolysis.

The polyurethanes (1) contain preferably from 0 to 30 mol %, with particular preference from 4 to 25 mol %, based on the total amount of components (b1) and (d1), of a polyamine having at least 2 isocyanate-reactive amino groups, as monomers (d1).

For the same purpose it is also possible as monomers (d1) to use isocyanates having a functionality of more than two. Examples of customary commercial compounds are the isocyanurate or the biuret of hexamethylene diisocyanate.

Monomers (e1) which are used if desired are monoisocyanates, monoalcohols and monoprimary and monosecondary amines. In general their proportion is not more than 10 mol %, based on the total molar amount of the monomers. These monofunctional compounds usually carry further functional groups such as olefinic groups or carbonyl groups and serve to introduce functional groups into the polyurethane which permit the polyurethanes to be dispersed and/or crosslinked or to undergo further polymer-analogous reaction. Monomers appropriate for this purpose are those such as isopropenyl alpha,alpha-dimethylbenzyl isocyanate (TMI) and esters of acrylic or methacrylic acids such as hydroxyethyl acrylate or hydroxyethyl methacrylate.

Within the field of polyurethane chemistry it is generally known how the molecular weight of the polyurethanes can be adjusted by choosing the proportions of the co-reactive monomers and by the arimethic mean of the number of reactive functional groups per molecule.

Normally, the components (a1) to (e1) and their respective molar amounts are chosen such that the ratio A:B, where A) is the molar amount of isocyanate groups and
B) is the sum of the molar amounts of the hydroxyl groups and of the functional groups which are able to react with isocyanates in an addition reaction, is from 0.5:1 to 2:1, preferably from 0.8:1 to 1.5:1, with particular preference from 0.9:1 to 1.2:1. With very particular preference the ratio A:B is as close as possible to 1:1.

The monomers (a1) to (e1) employed carry on average usually from 1.5 to 2.5, preferably from 1.9 to 2.1 and, with particular preference, 2.0 isocyanate groups and/or functional groups which are able to react with isocyanates in an addition reaction.

The polyaddition of the components (a1) to (e1) takes place in general at reaction temperatures from 20 to 180° C., preferably from 50 to 150° C., under atmospheric pressure or under the autogenous pressure.

The reaction times required can extend from a few minutes to several hours. In the field of polyurethane chemistry it is known how the reaction time can be affected by a large number of parameters such as temperature, monomer concentration, and monomer reactivity.

In order to accelerate the reaction of the isocyanates it is possible to use the customary catalysts, such as dibutyltin dilaurate, tin(II) octoate, or diazabicyclo[2.2.2]octane.

Suitable polymerization apparatuses are stirred vessels, especially when the use of solvents ensures a low viscosity and good heat dissipation.

Preferred solvents are of unlimited miscibility with water, have a boiling point from 40 to 100° C. under atmospheric pressure, and react slowly if at all with the monomers.

If desired, it is also possible to use fractions of other solvents which are of unlimited miscibility with water and have a boiling point >100° C. under atmospheric pressure. Examples are N-methylpyrrolidone, dimethylformamide and dimethylacetamide.

These high-boiling solvents can remain in the dispersion. However, they should not be used in amounts of more than 10% by weight based on the dispersion.

The dispersions are usually prepared in accordance with one of the following methods:

In accordance with the "acetone method" an ionic polyurethane is prepared from components (a1) to c1) in a water-miscible solvent which boils at below 100° C. under atmospheric pressure. Water is added in an amount sufficient to form a dispersion in which water constitutes the coherent phase.

The "prepolymer mixing method" differs from the acetone method in that, rather than a fully reacted (potentially) ionic polyurethane a prepolymer is prepared first of all which carries isocyanate groups. In this case the components are chosen such that the as-defined ratio A:B is greater than from 1.0 to 3, preferably from 1.05 to 1.5. The prepolymer is first dispersed in water and is then crosslinked if desired by reaction of the isocyanate groups with amines carrying more than 2 isocyanate-reactive amino groups or is chain-extended with amines which carry 2 isocyanate-reactive amino groups. Chain extension also takes place if no amine is added. In this case, isocyanate groups are hydrolyzed to amino groups, which react with remaining isocyanate groups of the prepolymers and so result in chain extension.

If a solvent has been used in preparing the polyurethane, the majority of this solvent is usually removed from the dispersion, by means, for example, of distillation under reduced pressure. The dispersions preferably have a solvent content of less than 10% by weight and with particular preference are free from solvents.

The dispersions generally have a solids content of from 10 to 75, preferably 20 to 65% by weight and a viscosity of from 10 to 500 mPas (measured at a temperature of 20° C. and a shear rate of 250 s$^{-1}$).

Hydrophobic auxiliaries, which in some cases are difficult to distribute homogeneously in the finished dispersion, such as, for example, phenol condensation resins formed from aldehydes and phenol and/or phenol derivatives or epoxy resins, and further polymers specified, for example, in DE-A-3 903 538, 43 09 079 and 40 24 567, which are used in polyurethane dispersions as adhesion promoters, for example, can be added to the polyurethane or to the prepolymer even prior to dispersion by the methods described in the two abovementioned documents.

Formulations comprising the polyurethane dispersion (1) of the invention may include commercially customary auxiliaries and additives such as further polymers (B) in dispersed form, blowing agents, defoamers, emulsifiers, thickeners and thixotropic agents, and colorants such as dyes and pigments.

The polymers (B) which are present in the dispersion of the invention can, for example, comprise a polyurethane (2) which is commonly built up from a2) diisocyanates containing no carbodiimide groups, (b2) diols of which
  (b2.1) from 0 to 100 mol %, based on the total amount of the diols (b2), have a molecular weight of from 500 to 5000, and
  (b2.2) from 0 to 90 mol %, based on the total amount of the diols (b2), have a molecular weight of from 60 to 500 g/mol, c2) monomers other than the monomers (a2) and (b2), having at least one isocyanate group or at least one isocyanate-reactive group, which additionally carry at least one hydrophilic group or potentially hydrophilic group, by means of which the polyurethanes are made dispersible in water, d2) if desired, polyvalent compounds other than the monomers (a2) to (c2), having reactive groups which are alcoholic hydroxyl groups, primary or secondary amino groups or isocyanate groups, and e2) if desired, monovalent compounds other than the monomers (a2) to (d2), having a reactive group which is an alcoholic hydroxyl group, a primary or secondary amino group or an isocyanate group.

Suitable monomers (a2), (b2), (c2), (d2) and (e2) are the same monomers which can be used as monomers (a1.2), (b1), (c1), (d1) and (e1). Apart from the fact that they contain no carbodiimide groups they are subject to the same criteria as for the polyurethanes (1), i.e., they otherwise have generally the same properties and can be prepared in principle in the same way as the polyurethanes (1).

Further suitable polymers (B) are polymers prepared by free-radically initiated polymerization (polymer 3). These are usually built up from a3) from 30 to 100 parts by weight of at least one monomer from the group consisting of $C_1$–$C_{20}$ alkyl (meth)acrylates, vinyl esters, carboxylic acids having up to 20 carbon atoms, ethylenically unsaturated nitriles, vinylaromatic compounds having up to 20 carbon atoms, vinyl halides and aliphatic hydrocarbons having 2 to 8 carbon atoms and 1 or 2 double bonds (monomers a3), and b3) from 0 to 70 parts by weight of other compounds I having at least one ethylenically unsaturated group (monomers (b3);

where (meth)acryl- is a short form standing for methacryl- or acryl-.

Examples of monomers (a3) are (meth)acrylic acid alkyl esters having a $C_1$–$C_{10}$ alkyl radical, such as methyl methacrylate, methyl acrylate, n-butyl acrylate, ethyl acrylate and 2-ethylhexyl acrylate.

Mixtures of the (meth)acrylic acid alkyl esters are also particularly suitable.

Examples of vinyl esters of carboxylic acids having 1 to 20 carbon atoms are vinyl laurate, vinyl stearate, vinyl propionate and vinyl acetate.

Suitable vinyl aromatic compounds are vinyltoluene, alpha- and p-ethylstyrene, alpha-butylstyrene, 4-n-butylstyrene, 4-n-decylstyrene and, preferably, styrene.

Examples of nitriles are acrylonitrile and methacrylonitrile.

The vinyl halides are chloro-, fluoro- or bromo-substituted ethylenically unsaturated compounds, preferably vinyl chloride and vinylidene chloride. vinyl halides, however, are not preferred.

Examples that may be mentioned of nonaromatic hydrocarbons having 2 to 8 carbon atoms and one or two olefinic double bonds are butadiene, isoprene and chloroprene, and also ethylene, propylene and isobutylene.

The principal monomers are also preferably used in a mixture.

Vinylaromatic compounds such as styrene, for example, are frequently used in a mixture with $C_1$–$C_{20}$ alkyl(meth) acrylates, especially with $C_1$–$C_8$ alkyl(meth)acrylates, or with nonaromatic hydrocarbons such as isoprene or, preferably, butadiene.

Examples of suitable monomers (b3) are esters of acrylic and methacrylic acid with alcohols having 1 to 20 carbon atoms, which in addition to the oxygen atom in the alcohol group contain at least one further heteroatom and/or contain an aliphatic or aromatic ring, such as 2-ethoxyethyl acrylate, 2-butoxyethyl(meth)acrylate, dimethylaminoethyl(meth) acrylate, diethylaminoethyl(meth)acrylate, aryl, alkaryl or cycloalkyl(meth)acrylates, such as cyclohexyl(meth) acrylate, phenylethyl(meth)acrylate, phenylpropyl(meth) acrylate or acrylic esters of heterocyclic alcohols, such as furfuryl(meth)acrylate.

Also suitable, furthermore, are monomers having amino groups or amide groups, such as (meth)acrylamide, and their N—$C_1$–$C_4$-alkyl-substituted derivatives.

Of particular importance are hydroxy-functional monomers, examples being (meth)acrylic acid $C_1$–$C_{15}$ alkyl esters, which are substituted by one or two hydroxyl groups. Particularly significant hydroxy-functional comonomers are (meth)acrylic acid $C_2$–$C_8$ hydroxyalkyl esters, such as n-hydroxyethyl, n-hydroxypropyl or n-hydroxybutyl(meth) acrylate.

It is frequently advisable to make additional use of monomers having carboxylic acid or carboxylic-anhydride groups, examples being acrylic acid, methacrylic acid, itaconic acid and maleic or fumaric anhydride; these monomers are used preferably in amounts of from 0 to 10% by weight, with particular preference from 0.1 to 3% by weight, based on the copolymer.

The copolymer A) is prepared by means of free-radical polymerization. Suitable polymerization methods, such as bulk, solution, suspension and emulsion polymerization, are known to the person skilled in the art.

The copolymer is preferably prepared by solution polymerization with subsequent dispersion in water or, with particular preference, by emulsion polymerization.

In the case of emulsion polymerization the comonomers can be polymerized as usual in the presence of a water-soluble initiator and an emulsifier preferably at from 30 to 95° C.

Examples of suitable initiators are sodium, potassium and ammonium persulfates, peroxides such as tert-butyl hydroperoxide for example, water-soluble azo compounds, or else redox initiators.

Examples of emulsifiers used are alkali metal salts of relatively long-chain fatty acids, alkyl sulfates, alkysulfonates, alkylated arylsulfonates or alkylated biphenyl ether sulfonates. Further suitable emulsifiers are reaction products of alkylene oxides, especially ethylene oxide or propylene oxide, with fatty alcohols or fatty acids or phenol and/or alkylphenols.

In the case of aqueous secondary dispersions, the copolymer is first prepared by solution polymerization in an organic solvent and is then dispersed in water by adding salt formers, such as ammonia to copolymers containing carboxylic acid groups, without the use of an emulsifier or dispersing aid. The organic solvent can be removed by distillation. The preparation of aqueous secondary dispersions is known to the person skilled in the art and is described, for example, in DE-A-37 20 860.

In the course polymerization it is possible to use regulators to adjust the molecular weight. Suitable examples are compounds containing —SH groups, such as mercaptoethanol, mercaptopropanol, thiophenol, thioglycerol, ethyl thioglycolate, methyl thioglycolate, and tert-dodecyl mercaptan. They can be used, for example, in amounts of from 0 to 0.5% by weight, based on the copolymer.

The nature and amount of the comonomers are preferably chosen such that the resulting copolymer has a glass transition temperature of from —60 to +140° C., preferably from —60 to +100° C. The glass transition temperature of the copolymer is determined by means of differential thermoanalysis or differential scanning calorimetry in accordance with ASTM 3418/82.

The number-average molecular weight $M_n$ is preferably from $10^3$ to $5 \cdot 10^6$, with particular preference from $10^5$ to $2 \cdot 10^6$ g/mol (as determined by gel permeation chromatography using polystyrene as standard).

Based on the solids content of the aqueous dispersion D, aqueous dispersions used in the bonding process of the invention preferably have the following composition:

A) from 5 to 95% by weight of a polyurethane (1), which carries hydrophilic groups which allow the polyurethane to be dispersed in water, and
B) if desired, from 5 to 90% by weight of a polymer (B) or contain no polymers (B).

The dispersions D may include commercially customary auxiliaries and additives such as blowing agents, defoamers, emulsifiers, thickeners and thixotropic agents, and colorants such as dyes and pigments.

In order to improve the heat stability it is possible to add water-emulsifiable isocyanates, as can be obtained, for example, by reacting polyisocyanates with poly-$C_2$–$C_4$-alkylene glycols (cf. EP-A-0 206 059 and DE-A-4 036 927), to the dispersions, preferably immediately before they are applied to the workpieces.

The dispersions D are suitable for the adhesive bonding of a wide variety of substrates.

Examples of suitable articles are those made from wood, wood fibers, metal, plastic or leather, examples being sheets of all kinds, especially furniture foils or polymer foam.

The adhesive bonding of the articles takes place in different operations, by

I. coating the surface of an article with the dispersion D (coating I),
II. drying the dispersion D with which the article is coated to give an essentially anhydrous coating (coating II),
III. preparing a coating III by subjecting the coating II to heat activation, and
IV. joining the coating III to an adhesive composite IV.

Particularly advantageous results are obtained if the adhesive bonds are prepared by carrying out the operations Ia to IIIa Ia. preparing a coating Ia by coating an article with a dispersion D,
IIa. preparing a coating IIIa by drying the coating Ia,
IIIa. preparing an adhesive bond IIIa by contacting the surface of the coating IIa with itself, with a part of the surface of the article that has not been coated with the coating IIa, or with the surface of another article, said coating IIa having a temperature of from 20 to 2000° C.;

or carrying out the following operations Ib to IVb:

Ib. preparing a coating Ib by coating an article with a dispersion D,
IIb. preparing a coating IIb by drying the coating Ib,
IIIb. preparing a coating IIIb by heating the coating IIb to a temperature of from 30 to 100° C., and
Ivb. preparing an adhesive bond IVb by contacting the surface of the coating IIIb with itself, with a part of the surface of the article that has not been coated with the coating IIb, or with the surface of another article, within a period of 15 minutes from the cooling of the coating IIIb to a temperature of from 30 to 80° C.

The coating I, Ia or Ib respectively is judiciously prepared in accordance with customary methods such as spraying, pouring or knife coating.

If the dispersion D is applied by spraying, it is frequently possible to omit a separate drying step, since a large proportion of the water evaporates during the spraying process itself.

The coating I, Ia or Ib respectively can be dried (preparation of the coating IIa or IIb respectively) at room temperature or at elevated temperature, for example, at temperatures from 40 to 150° C., by irradiation with infrared light.

After drying, coatings II, IIa and IIb usually contain less than 5% by weight of water.

If the coating Ib is dried at not less than 30° C., then the preparation of the coatings IIb and IIIb takes place simultaneously in a single operation.

Otherwise, the heat activation and/or the preparation of the coating III or IIIb from the coating IIb can take place likewise by irradiation with infrared light or by heating in a stream of hot air at a later point in time.

The preparation of the adhesive composites IV and/or adhesive bonds IIIa and/or IVb is usually carried out in presses, using a pressure of from 0.05 to 5 $N/mm^2$. In the case of the preparation of the adhesive bonds IIIa it is normal to employ heated presses.

The process of adhesive bonding by contacting the surface of the coatings III, IIa and IIIb with themselves or with other parts of the surface of the article requires, of course, that the article to which the coating has been applied is flexible, as is the case, for example, with foils. This process is utilized, for example, in the packaging industry. Parts of a foil coated with the coatings III, IIa or IIIb, respectively, are folded, for example, and the overlying foil sections are bonded at appropriate points so as to form pouches or pockets.

The materials of the articles to be bonded to one another can be identical or different. Adhesive bonding processes where the coating III, IIa or IIIb respectively is bonded to the surface of another article are employed, for example, to produce composites of rigid fiberboards with PVC sheet. These composite materials are used in fitting out car interiors. Particularly high bond strengths are achieved if the surface of the other article is likewise provided with a coating III, IIa or IIIb respectively.

Another reason why the dispersions are especially suitable as adhesives is that in comparison with typical PU dispersions they allow the production of particularly strong bonds, even on prolonged storage for months at room temperature or about 1 month at 40 to 50° C. This relates in particular to the strength immediately after bonding.

Consequently, the dispersions D are particularly suitable for applications where it cannot be ruled out that the dispersions, following their preparation and continuing up to the time where they are used as an adhesive—that is, up to the time of the application of the dispersions D to the workpiece that is to be bonded—are stored for more than 3 months. This applies especially if the dispersion is used as an adhesive in a procedure employing the operations I to IV.

Experimental Section

Abbreviations

DETA=diethylenetriamine
HMDI=bis(4-isocyanatocyclohexyl)methane
IPDA=isophoronediamine
DBTL=dibutyltin dilaurate
TMXDI=tetramethylxylylene diisocyanate
IPDI=1-isocyanato-3,5,5-trimethyl-5-isocyanatomethylcyclohexane
CDI=carbodiimide
PUD=polyurethane dispersions
OHN=hydroxyl number A. Starting materials
Examples for the preparation of PU dispersions
In the examples, the carbodiimide used is that of TMXDI.

EXAMPLE 1

Dispersion with Carbodiimide 731.7 g of a polyester formed from adipic acid and butanediol (OHZ=46), 0.06 g of DBTL and 33.1 g of TDI were reacted in 260 g of acetone at 65° C. for 1 h. Then 32 g of HDI and 32.2 g of an NCO-terminal carbodiimide containing 8% NCO and 15% CDI in 40 g of acetone were added and the mixture was stirred at 65° C. for 90 minutes. It was then diluted with 650 g of acetone and cooled to 50° C. The NCO content was 0.6%. The product was chain extended with 42.2 g of a 50% strength aqueous solution of sodium aminoethylaminoethane sulfonate and dispersed with 1050 g of deionized water. The acetone was removed by distillation under reduced pressure at temperatures of up to 43° C. and the solids content was adjusted to 45%.

Analytical data: LT:93 Visc.: 185 mPas K value: 58 pH: 7.2

EXAMPLE 2

Dispersion with Carbodiimide 731.7 g of a polyester formed from adipic acid and butanediol (OHZ=46), 0.06 g of DBTL and 34 g of TDI were reacted in 275 g of acetone at 65° C. for 1 h. Then 32.8 g of HDI and 21.46 g of an NCO-terminal carbodiimide containing 8% NCO and 15% CDI in 25 g of acetone were added and the mixture was stirred at 65° C. for 87 minutes. It was then diluted with 650 g of acetone and cooled to 50° C. The NCO content was 0.61%. The product was chain extended with 42.2 g of a 50% strength aqueous solution of sodium aminoethylaminoethane sulfonate and dispersed with 1050 g of deionized water. The acetone was removed by distillation under reduced pressure at temperatures of up to 43° C. and the solids content was adjusted to 44%.
Analytical data: LD: 93 Visc.: 145 mPas K value: 54.4 pH: 7.7

EXAMPLE 3

Dispersion with Carbodiimide 731.7 g of a polyester formed from adipic acid and butanediol (OHZ=46), 0.06 g of DBTL and 34.8 g of TDI were reacted in 300 g of acetone at 65° C. for 1 h. Then 33.6 g of HDI and 10.7 g of an NCO-terminal carbodiimide containing 8% NCO and 15% CDI in 15 g of acetone were added and the mixture was stirred at 65° C. for 86 minutes. It was then diluted with 650 g of acetone and cooled to 50° C. The NCO content was 0.57%. The product was chain extended with 42.2 g of a 50% strength aqueous solution of sodium aminoethylaminoethane sulfonate and dispersed with 1050 g of deionized water. The acetone was removed by distillation under reduced pressure at temperatures of up to 43° C. and the solids content was adjusted to 44%.

Analytical data: LD: 85 Visc.: 47 mPas K value: 52 pH: 7.7

EXAMPLE 4

Dispersion with Carbodiimide 731.7 g of a polyester formed from adipic and butanediol (OHZ=46), 0.06 g of DBTL and 35.3 g of TDI were reacted in 2.85 g of acetone at 65° C. for 1 h. Then 34 g of HDI and 5.36 g of an NCO-terminal carbodiimide containing 8% NCO and 15% CDI in 15 g of acetone were added and the mixture was stirred at 65° C. for 98 minutes. It was then diluted with 650 g of acetone and cooled to 50° C. The NCO content was 0.60%. The product was chain extended with 42.2 g of a 50% strength aqueous solution of sodium aminoethylaminoethane sulfonate and dispersed with 1050 g of deionized water. The acetone was removed by distillation under reduced pressure at temperatures of up to 43° C. and the solids content was adjusted to 45%.

Analytical data: LD: 78 Visc.: 44 mPas K value: 58 pH: 7.6

EXAMPLE 5

Comparative Example without Carbodiimide 731.8 g of a polyester formed from adipic acid and butanediol (OHZ=46), 0.06 g of DBTL and 35.7 g of TDI were reacted in 300 g of acetone at 65° C. for 1 h. Then 34.5 g of HDI were added and the mixture was stirred at 60° C. for 67 minutes. It was then diluted with 650 g of acetone and cooled to 50° C. The NCO content was 0.57%. The product was chain extended with 42.3 g of a 50% strength aqueous solution of sodium aminoethylaminoethane sulfonate and dispersed with 1050 g of deionized water. The acetone was removed by distillation under reduced pressure at temperatures of up to 43° C. and the solids content was adjusted to 45%.

Analytical data: LD: 50 Visc.: 29 mPas K value: 58 pH: 8.1

The samples were bonded and tested before and after storage of the samples for 4 weeks at 40° C., in accordance with the procedure specified below. The results can be seen from the tables. It is known from experience that these forced conditions correspond to storage at RT for approximately 6 months.

In the case of the heat resistance test with temperature profile and in the case of the dynamic peel strength test, the samples were admixed immediately before application with 2% of Collacral® VL, a commercially customary thickener, and 7.5% Desmodur® DA, a polyisocyanate crosslinker (solids/solids).

1. Test Procedures for Adhesive Tests
1.1. Test of Static Peel Strength with Heating
Apparatus: 2 mm wire-wound coating bar Circulating-air drying cabinet
    Chronometer
    Heatable press
    Knife for cutting out the test strips
    300 g weights
    Substrate: Rigid fiberboard/PVC sheet, Type: Benecke 577/E28
    Dimensions: 200×200 mm
    Bonding area: 200×170 mm (subdivided into 5 test strips measuring 30 mm each)
    Application: 2 mm wire-wound coating bar onto rigid fiberboard in lengthwise direction
    Drying: 3 minutes at 60° C.
    Mode of bonding: Hot pressing at 80° C., PVC side only
    Pressure: 0.1 N/mm$^2$
    Duration of pressing: 30 s
    Sample storage: 1 day at RT
    Test load: 300 g per 30 mm wide test strip
    Peel angle: 180° C.
    Number of samples: 1 plate=5 samples
    Evaluation: HS in °C.—with <10 mm peeling Procedure Following application of the adhesive, drying and pressing, 30 mm wide strips with an interval of 10 mm in between are cut from the area produced in this way. When cutting, it is only the sheet which is separated; the rigid fiberboard remains undamaged. The 10 mm wide strips in between are removed and a 300 g weight is clamped to each of the 30 mm wide test strips.

Testing

The test begins at 40° C. After intervals of 30 minutes the temperature is raised by 10° C. In the heating phase, which lasts 15 minutes, the test strips are not loaded.

Result

An assessment is made of the type of fracture and of the temperature, in °C., at which the bond still holds.

If peel exceeds 10 mm the test is ended.
Assessment of the fracture type:

A=detachment of the adhesive film from a material (adhesive fracture)
C=separation in the adhesive film without detachment from a material (cohesive fracture)
N=non-bonding of the two adhesive films without detachment from a material (inadequate coalescence)
S=detachment of the surface layer of a material
M=partial or complete fracture of a material
Z=zippy delamination 1.2. Heat Stability Test with Temperature Profile The dispersions are applied to 5 beechwood test specimens each using a spray gun. After 60 minutes of drying at RT a customary commercial PVC furniture film is laminated onto the beechwood in a press (pressure: 0.5 N/mm$^2$, duration of pressing: 10 s). Following lamination and subsequent thermal conditioning (3 minutes at 80° C.) the test specimens are subjected to thermal stress at 80° C. Initially, a load of 500 g is used. If there is still no complete peel after 5 minutes, the load is increased by a further 500 g, and so on, until either peeling exceeds 20 mm or a total load of 3000 g has been reached. The results of the test can be seen from the tables.

| 1.3. Dynamic peel strength | |
|---|---|
| Basis: | European testing method for shoe materials |
| Apparatus: | Roughening machine — in-house construction with emery cloth P 40 |
| | Brush — Ludwigshafen School for the Blind |
| | 1 "paintbrush" |
| | Press |
| | Melting salts |
| | Activating equipment (IR) |
| | Tensile tester |
| Substrate: | SBR1/SBR1 |
| | Shore 90 A; Liderfant Shoe Institute, Pirmasens |
| Preparation: | 1 to 5 hours before testing in lengthwise direction |
| | roughening and brushing |
| Dimensions: | 150 × 30 mm |
| Bonding area: | 120 × 30 mm |
| Application: | Paintbrush; on both substrates in direction of roughening |
| Evaporation time: | 45 minutes at room temperature |
| Activation: | 80° C.; surface temperature |
| Activation time: | is determined with melting salts |
| Mode of bonding: | Pressing directly after activation |
| Pressure: | 0.5 N/mm$^2$ |
| Duration of pressing: | 10 seconds |
| Number of samples: | 3 * immediate values, 3 * 5-day values |
| Peel angle: | 180° |
| Testing speed: | 100 mm/min |
| Testing: | Instantaneous peel strength |
| | Peel strength after 5 days of storage under standard climatic conditions |
| | (23° C./50% rel. atmospheric humidity) |
| Test report: | Date |
| | Nature and designation of sample |
| | Formulation and, if appropriate, pretreatment |
| | Activation temperature |
| | Measurement data in N/mm |

Assessment of the fracture type:

A=detachment of the adhesive film from a material (adhesive fracture)
C=separation in the adhesive film without detachment from a material (cohesive fracture)
N=non-bonding of the two adhesive films without detachment from a material (inadequate coalescence)

S=detachment of the surface layer of a material
M=partial or complete fracture of a material
Z=zippy delamination 2. Measurement of the Viscosities The viscosities of the dispersions were measured at a temperature of 20° C. and a shear rate of 250 s$^{-1}$ using a rotational rheometer having concentric cylinders (spindle diameter 38.7 mm, beaker diameter: 42.0 mm).

2. Test Results

The results of testing of the static peel strength with heating are shown in Tab. 1, of the heat stability with temperature profile in Tab. 2, and of the dynamic peel strength in Tables 3 and 4.

3. Determination of the LT Value

The size of the latex particles (LT) was determined indirectly by means of turbidity measurements. For this purpose the turbidity of a dispersion having a solids content of 0.01% by weight was determined relative to that of distilled water, at room temperature and with a path length of 2.5 cm.

3. Determination of the K Value

The K value was determined in accordance with the method described in Kirk-Othmer, Encyclopedia of Chemical Technology, Third Edition, John Wiley & Sons, Inc. 1983, Volume 23 on page 967. The solvent used was dimethylformamide.

TABLE 1

Result of the static peel strength test

| Example | immediate strength before storage | immediate strength after storage |
|---|---|---|
| Example 1 | 5 × 3 kg | 5 × >3 kg |
| Example 2 | 5 × 2 kg | 2 × 2 kg; 1 × 2.5 kg; 2 × 3 kg |
| Example 3 | 5 × 0.5 kg | 2 × 1 kg; 2 × 1.5 kg; 1 × 2 kg |
| Example 4 | 5 × 2 kg | 1 × 1 kg; 1 × 2 kg; 3 × 2.5 kg |
| Example 5 (for compar.) | 5 × 0.5 kg | 5 × <0.5 kg |

TABLE 2

Result of the heat stability test with temperature profile

| Example | before storage [° C.] | after storage [° C.] |
|---|---|---|
| Example 1 | 120 | 120 |
| Example 2 | 120 | 120 |
| Example 3 | 120 | 120 |
| Example 4 | 120 | 120 |
| Example 5 (for compar.) | 120 | 100 |

TABLE 3

Dynamic peel strength before storage

| | immediate | | 5 days | |
|---|---|---|---|---|
| | N/mm | fracture | N/mm | fracture |
| Example 1 | 0.77 | A/C | 6.74 | A/C/MR |
| Example 2 | 0.82 | A/C | 6.06 | A/MR |
| Example 3 | 0.72 | A/C | 6.54 | A/C |
| Example 4 | 0.761 | A/C | 5.82 | A/C |
| Example 5 (for compar.) | 0.82 | C/N | 3.91 | A |

TABLE 4

Dynamic peel strength after storage

| | immediate | | 5 days | |
|---|---|---|---|---|
| | N/mm | fracture | N/mm | fracture |
| Example 1 | 0.50 | A | 4.75 | C |
| Example 2 | 0.40 | A | 4.66 | C |
| Example 3 | 0.47 | A | 4.92 | C |
| Example 4 | 0.31 | A | 5.32 | C |
| Comparative example | 0.81 | C/A | 3.48 | C |

We claim:

1. A process for producing an adhesive bond, said process comprising
coating at least a portion of a surface of an article with a dispersion D to give a coating I,
drying said dispersion D coated on said article to give an essentially anhydrous coating II,
subjecting said coating II to heat activation to give a coating III, and
joining said coating III to either a surface of another article or to itself to form an adhesive bond,
wherein said dispersion D comprises a polyurethane (1), said polyurethane (1) comprising one or more carbodiimide structural units of the formula (I)

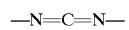
$$—N{=}C{=}N— \qquad (I),$$

wherein said one or more carbodiimide structural units are incorporated within the polymer structure of said polyurethane.

2. The process as claimed in claim 1, wherein at least a portion of the article is coated with the dispersion D and the adhesive bond is obtained by contacting the surface of the coating II with itself, with a portion of the surface of the article that has not been coated with the coating II, or with the surface of another article, at a temperature of from 20 to 200° C.

3. The process as claimed in claim 1, wherein heat activation comprises heating the coating II to a temperature of from 30 to 150° C., and the adhesive bond is obtained by contacting the surface of the coating III with itself, with a portion of the surface of the article that has not been coated with the coating II, or with the surface of another article, within a period of 15 minutes from the cooling of the coating III to a temperature of from 0 to 80° C.

4. The process as claimed in claim 1, wherein the dispersion D is stored for at least 3 months from its preparation before coating at least a portion of the surface of the article.

5. The process as claimed in claim 1, wherein the dispersion D comprises from 5 to 400 mmol/kg of the one or more carbodiimide structural units, based on polyurethane (1).

6. The process as claimed in claim 1, wherein the polyurethane (1) comprises one or more polyisocyanates derived from one or more carbodiimide structural units of the formula (I).

7. The process as claimed in claim 6, wherein the one or more polyisocyanates comprise polymerized units of tetramethylxylylene diisocyanate (TMXDI).

8. The process as claimed in claim 1, wherein the dispersion D comprises, one or more diisocyanates, said one or more diisocyanates optionally comprising one or more structural units of the formula (I), one or more diols of which from 0 to 100 mol % have a molecular weight of from 500 to 5000 based on a total amount of said one or more diols, and from 0 to 90 mol % have a molecular weight of from 62 to 500 g/mol based on a total amount of said one or more diols, one or more monomers other than said one or more diisocyanates and said one or more diols, having at least one isocyanate group or at least one isocyanate-reactive group, and at least one hydrophilic group or potentially hydrophilic group, by means of which the polyurethane is made dispersible in water, optionally, one or more polyvalent compounds other than said one or more diisocyanates, said one or more diols and said one or more monomers having one or more reactive groups which are alcoholic hydroxyl groups, primary or secondary amino groups or isocyanate groups, and optionally, one or more monovalent compounds other than said one or more diisocyanates, said one or more diols, said one or more monomers and said one or more polyvalent compounds, having a reactive group which is an alcoholic hydroxyl group, a primary or secondary amino group or an isocyanate group.

9. The process as claimed in claim 8, wherein the one or more diols comprise one or more polyester polyols.

10. The process as claimed in claim 1, wherein dispersion D comprises, based on the solids content, from 5 to 95% by weight of the polyurethane (1) having one or more hydrophilic groups, optionally, from 5 to 95% by weight of a polymer (B), which comprises a polyurethane (2) which is different from the polyurethane (1) and comprises one or more diisocyanates which contain no carbodiimide groups, one or more diols of which from 10 to 100 mol % have a molecular weight of from 500 to 5000 based on a total amount of said one or more diols and from 0 to 90 mol % have a molecular weight of from 60 to 500 g/mol based on a total amount of said one or more diols, one or more monomers other than said one or more diisocyanates and said one or more diols, having at least one isocyanate group or at least one isocyanate-reactive group, and at least one hydrophilic group or potentially hydrophilic group, by means of which the polyurethanes, is made dispersible in water, optionally one or more polyvalent compounds other than said one or more diisocyanates, said one or more diols and said one or more monomers, having one or more reactive groups which are alcoholic hydroxyl groups, primary or secondary amino groups or isocyanate groups, and optionally, one or more monovalent compounds other than said one or more diisocyanates, said one or more diols, said one or more monomers and said one or more polyvalent compounds, having a reactive group which is an alcoholic hydroxyl group, a primary or secondary amino group or an isocyanate group or a polymer prepared by means of free-radically initiated polymerization, which comprises from 30 to 100 parts by weight of at least one monomer selected from the group consisting of $C_1$–$C_{20}$ alkyl(meth)acrylates, vinyl esters, carboxylic acids having up to 20 carbon atoms, ethylenically unsaturated nitrites, vinylaromatic compounds having up to 20 carbon atoms, vinyl halides and aliphatic hydrocarbons having 2 to 8 carbon atoms and 1 or 2 double bonds, and from 0 to 70 parts by weight of one or more other compounds having at least one ethylenically unsaturated group.

* * * * *